UNITED STATES PATENT OFFICE.

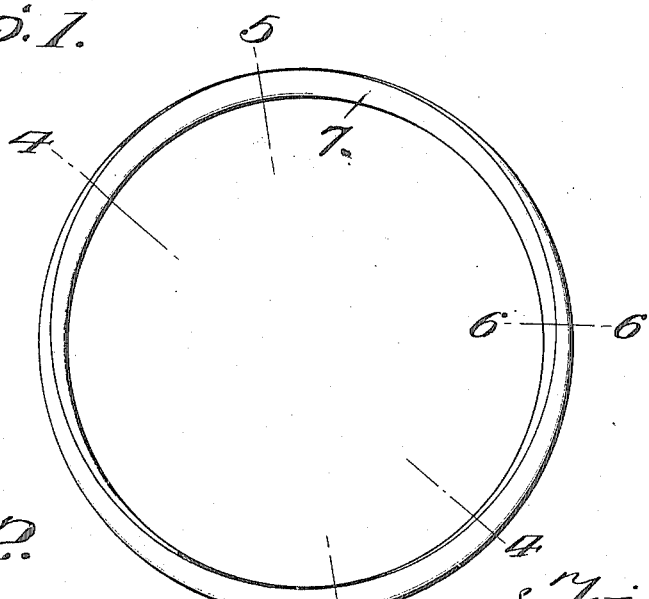
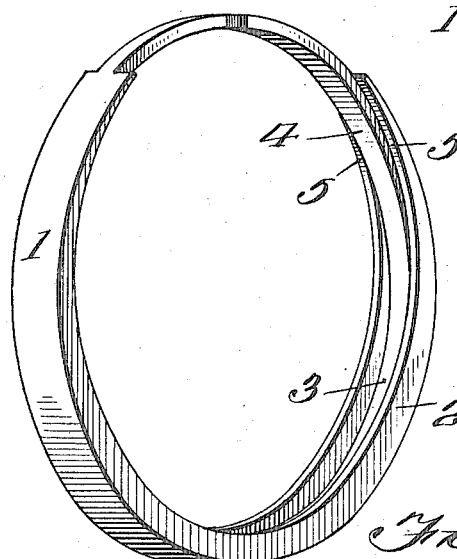
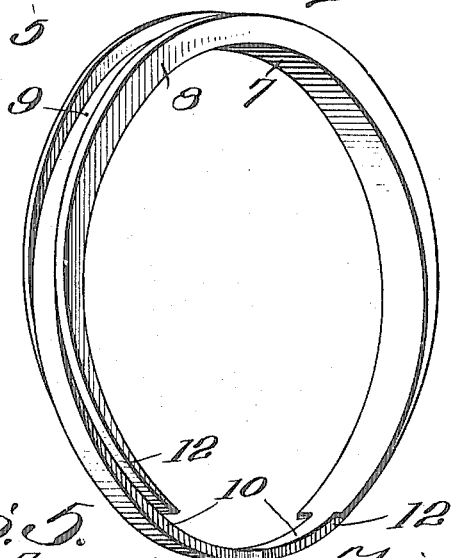
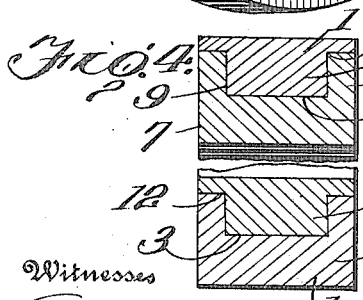
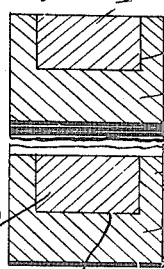

CLARANCE R. BRYANT, OF MEMPHIS, TENNESSEE, ASSIGNOR, BY MESNE ASSIGNMENTS, TO CONTINENTAL PISTON RING COMPANY, OF MEMPHIS, TENNESSEE, A CORPORATION OF TENNESSEE.

PISTON PACKING-RING.

1,180,969.　　　　　Specification of Letters Patent.　　Patented Apr. 25, 1916.

Application filed May 25, 1915.　Serial No. 30,291.

*To all whom it may concern:*

Be it known that I, CLARANCE R. BRYANT, of Memphis, in the county of Shelby and State of Tennessee, have invented certain new and useful Improvements in Piston Packing-Rings; and I do hereby declare the following to be a full, clear, and exact description of the invention, such as will enable others skilled in the art to which it appertains to make and use the same.

The object of this invention is to provide a piston packing ring which will insure against danger of leakage and which will present a continuous unbroken surface, leaving no openings through which steam or other fluid might escape.

In the accompanying drawings, Figure 1 is a view in side elevation of one of my packing rings. Fig. 2 is a view in perspective of the outer member. Fig. 3 is a similar view of the inner member. Figs. 4, 5 and 6 are, respectively, sections on lines 4—4, 5—5 and 6—6, Fig. 1.

Referring to the drawings, 1 designates what may be termed the outer member, which, briefly stated, consists of a split ring. This member is eccentric throughout a portion of its length, as at 2, while the remaining portion, including the split ends is concentric. In the eccentric portion is formed an inner groove 3 which gradually tapers toward its ends terminating in the end or concentric portions 4. The latter are grooved at 5 on opposite sides, said concentric members in width corresponding to the width of the groove 3. The inner member 7 is also split, and the eccentric portion 8 thereof is formed on its outer surface with a groove 9 which terminates in concentric members 10, grooves 12 being formed on the sides of these concentric members 10 just as the grooves 6 are formed on the sides of the concentric portions of the outer member, the difference being, however, that in the case of the outer member the grooves are on the inner surface, while in the case of the inner member they are on the outer surface. In consequence of this arrangement, the two members can be interlocked, one on the other, in such manner as to form a circular unit free from any passages through which steam or other fluid might escape, and the two members being firmly held are incapable of accidental slipping one on the other. By the peculiar formation of the inner and outer rings I secure an equal expansion of the packing ring at all points throughout its circumference.

The advantages of my invention will be readily appreciated by those skilled in the art.

I claim as my invention:

1. A packing ring comprising two encircling split members, each varying in thickness from its ends to a point midway between such ends, one member having a recess to receive a portion of the other member, and the latter, in turn, having a recess to receive a portion of the first mentioned member.

2. A packing ring comprising an outer split member having an inner groove of varying depth terminating short of the ends of such member, and an inner member having an outer groove to accommodate the non-grooved portions of the outer member, the groove of said inner member terminating short of the ends thereof, which ends are designed to fit in the grooved portion of the outer member.

3. A packing ring comprising an outer split member having an eccentric portion in the inner surface of which is formed a continuous groove, the remaining portions of the member beyond such groove being substantially concentric, and an inner member having an eccentric portion formed with a groove on its outer surface to receive the substantially concentric portions of the outer member, the remaining portion of said inner member being substantially concentric thereto, and designed to fit in the groove in the eccentric portion of the outer member.

In testimony whereof, I have signed this specification in the presence of two subscribing witnesses.

CLARANCE R. BRYANT.

Witnesses:
　MILDRED P. IMIRIE,
　FRANCIS S. MAGUIRE.